United States Patent [19]

Szakvary

[11] 4,430,757
[45] Feb. 7, 1984

[54] RADIOELECTRIC SIGNAL TRAINS GENERATOR AND PORTABLE TRANSMITTER COMPRISING SUCH A GENERATOR

[75] Inventor: Laszlo Szakvary, Paris, France

[73] Assignee: Elphora, Paris, France

[21] Appl. No.: 345,466

[22] Filed: Feb. 3, 1982

[30] Foreign Application Priority Data

Nov. 19, 1981 [FR] France ................................ 81 21689

[51] Int. Cl.³ ............................................ H04B 1/034
[52] U.S. Cl. .................... 455/100; 455/128; 343/702; 331/116 R
[58] Field of Search .................. 455/91, 95, 97, 100, 455/128, 129, 90; 331/116 R, 158; 375/71; 343/702

[56] References Cited

U.S. PATENT DOCUMENTS

| 1,993,436 | 3/1935 | Eberhard | 455/100 |
|---|---|---|---|
| 3,134,074 | 5/1964 | Litke | 455/91 |
| 3,462,710 | 8/1969 | Watase | 331/116 R |
| 3,806,936 | 4/1974 | Koster | 455/100 |
| 3,825,833 | 7/1974 | Bogue et al. | 455/128 |
| 4,327,444 | 4/1982 | Court | 455/129 |

FOREIGN PATENT DOCUMENTS 18940 11/1980 European Pat. Off. .............. 455/90

OTHER PUBLICATIONS

"Improved Break-In Keying For Crystal-Controlled Cathode-Keyed Transmitters" by Erdman, 10/1965.

*Primary Examiner*—Jin F. Ng
*Attorney, Agent, or Firm*—Birch, Stewart, Kolasch and Birch

[57] ABSTRACT

The present invention relates to a radio signals transmitter.

The transmitter according to the invention comprises a pulse train generator including a quartz oscillator, generating a high frequency signal which is provided to a transistor 7 controlled by the charge and the discharge of a condensor 5 acting on the voltage of its base. A train of A.C. frequency pulses is thereby produced.

The generator is protected by a housing which is worn around the neck of the user by means of a chain forming a quarter wavelength antenna.

The present invention is used as a portable distress signals transmitter for isolated persons, such as skiers, mountaineers or other people in difficulty.

8 Claims, 6 Drawing Figures

RADIOELECTRIC SIGNAL TRAINS GENERATOR AND PORTABLE TRANSMITTER COMPRISING SUCH A GENERATOR

BACKGROUND OF THE INVENTION

The present invention concerns a radio signal pulse train generator and a portable transmitter device comprising such a generator.

Portable transmitters enabling isolated persons to signal their presence, for example, when they find themselves in difficulty, are well known. Rescue teams, equipped with suitable receivers, interpret the signals emitted in order to reach the lost person. Such situations arise, for example, in the mountains when an isolated skier, alpinist or geologist finds himself stuck in adverse conditions due to an accident. Prompt rescue is thus necessary. The use of radio equipment can therefore considerably facilitate location of the isolated person.

Wider and more frequent presence of persons in the mountains due to the development of tourism and snow sports has increased the number of mountain accidents. The security of the persons involved has been vastly improved by equipping them with a portable transmitter which is both safe, extremely light, practically bulk-free and very inexpensive so as to be available to the largest number of persons.

An object of the present invention is thus to provide such equipment since, to the applicant's knowledge, there is no portable transmitter on the market displaying all the desired characteristics set out herein-above.

SUMMARY OF THE INVENTION

The objects of the invention is achieved with a radio signal pulse train generator comprising, in combination, a direct-current electric power supply, a condensor and a resistance located in series between the terminals of the electric power supply, a transistor the base of which is connected by a second resistance to the common terminal of the condensor and the resistance, the emitter of the transistor being wired to the terminal of the supply which is connected to the other terminal of the condensor, and a quartz crystal mounted between the collector and the base of the transistor in such a way that from the collector of the transistor a high frequency signal is available whose emission is monitored and controlled by the charges and discharges of the condensor, which are caused to pass periodically the fundamental voltage of the transistor from a blocking voltage to a saturation voltage.

The portable transmitter according to the invention is constructed by mounting this generator in a housing supporting an antenna. According to one preferred embodiment of the invention, the antenna is in the shape of a collar which enables the transmitter to be worn round the neck of the user. The length of the collar preferably corresponds to that of a quarter wavelength antenna so as to strengthen the signal emitted.

BRIEF DESCRIPTION OF THE DRAWINGS

Other characteristics and advantages of the transmitter according to the invention will become apparent from reading through the description which follows and the analysis of the attached drawings in which.

DETAILED DESCRIPTION OF A PREFERRED EMBODIMENT

Figure 1:
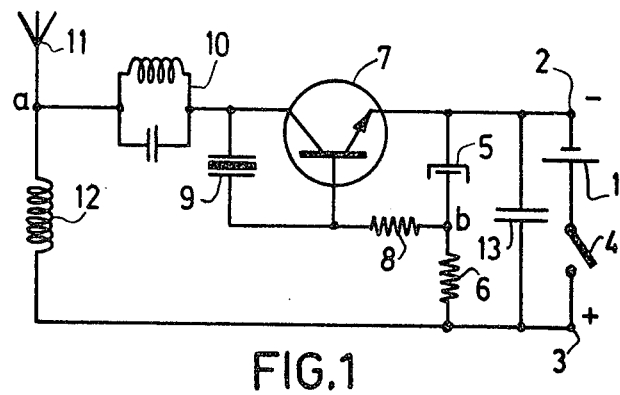
FIG. 1 is a diagram of the circuit wiring of the radio signal pulse train generator according to the invention.

FIG. 1 represents the generator circuit according to the invention which comprises a direct-current electric power supply 1, such as a battery, that can be wired to terminals 2 and 3 of the circuit by turning off a switch 4. A chemical condensor 5 and a resistance 6 are placed in series between terminals 2 and 3. The emitter of a NPN transistor 7 is connected to negative terminal 2 of the power supply 1, whereas its base is connected, through a second resistance 8, to common terminal b to condensor 5 and resistance 6. A quartz crystal 9 is wired between the collector and the base of transistor 7. A "partial" quartz crystal is used which preferably oscillates to the frequency of the third harmonic of the frequency for which said quartz has been cut. A circuit 10, tuned to the harmonic of the quartz, is placed between the collector of the transistor and an antenna 11. The circuit 10 displays high impedance for the main frequency signals. A shock inductor 12 and an uncoupling capacitor 13 complete the generator circuit.

When switch 4 is turned on, condensor 5 is charged through resistance 6. The voltage at paint b increases and activates the saturation of transistor 7. This transistor thus oscillates to the third harmonic of quartz 9. A strengthened current thus circulates in resistance 8, to discharge condensor 5. The voltage in b drops until the transistor is blocked, thereby interrupting the oscillation. The condensor 5 is thus recharged through resistance 6 and the operating cycle is repeated.

Figure 2:
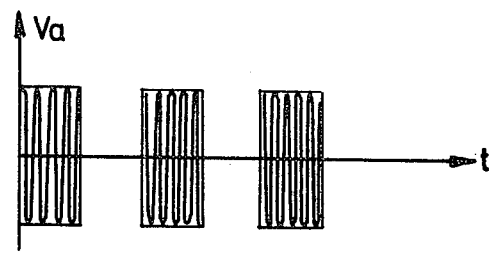
FIG. 2 shows the waveform of the signal pulse train emitted by the generator of FIG. 1.

After smoothing by tuned circuit 10, there is at point a on the antenna a signal, the waveform of which is represented in FIG. 2. This signal is a high frequency pulse train whose emission is monitored by the discharge of condensor 5. The frequency is adjusted by acting on the time constant of this discharge that is a function of the values selected for resistance 6 and condensor 5.

According to a preferred embodiment of the invention, a "partial" quartz whose basic frequency is 50 MHz is used. The A.C. frequency of each pulse burst is thus 150 MHz.

The small number of components constituting the generator favors improved miniaturization. It may thus be produced on a small printed circuit sheet 24, represented in FIG. 3 in position that it occupies inside the cylindrical housing of the portable transmitter according to the invention. On this figure which represents an axial section substantially to the scale of this transmitter, is also shown a cylindrical industrial battery 1, clamped between terminals 2 and 3 of the generator circuit. Terminal 3 is in the form of an elastic metallic blade, the free edge of which is hook-shaped. It is the pressure of the bottom of the housing on this hook that maintains contact between the battery and the terminals of the circuit.

Figures 3, 4, 5, 6:
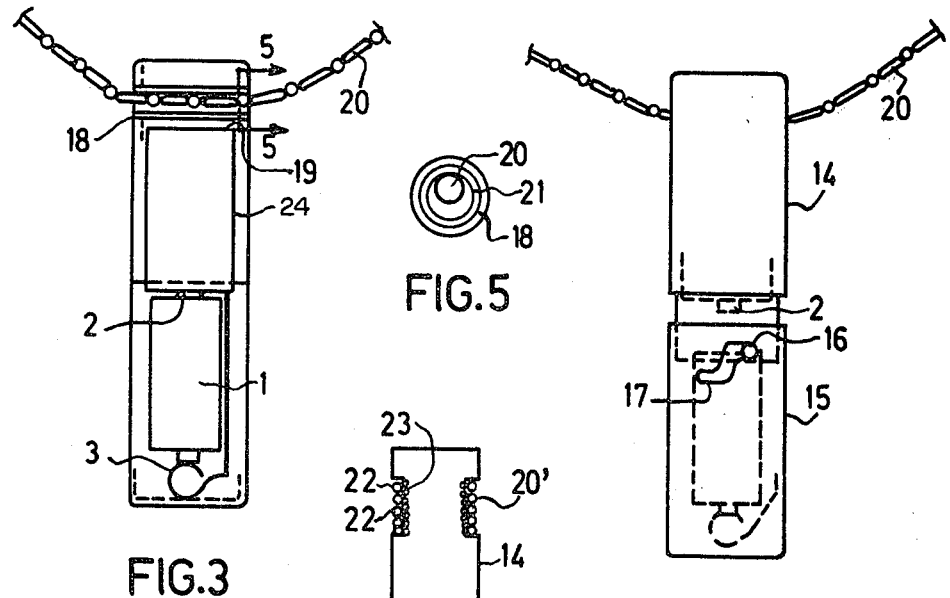
FIG. 3 is a view, substantially to scale, and along the axial section of the portable transmitter according to the invention, which comprises the generator of FIG. 1.
FIG. 4 represents the housing of the transmitter of FIG. 3 in the shape it assumes when the transmission signal is turned off.
FIG. 5 is a cross section of an embodiment of a detail of the transmitter according to the invention, detail of which corresponds to that cut by the line of section 5—5 on FIG. 3.
FIG. 6 is a view of part of a housing according to yet another embodiment.

It appears clear from FIG. 4 that the housing of the portable transmitter according to the invention, is formed of two cylindrical parts 14 and 15 movable with respect to each other. Part 14 bears at least one shoulder 16 which moves in an associated groove, cut as an "S" in the wall of part 15. Thus, by rotation of part 15 with respect to part 14, about their common axis, these parts may be placed either in the position of FIG. 3, where the battery feeds the generator circuit, or in the position of FIG. 4 where the circuit is open between terminal 2 and the battery due to the release of pressure of the bottom of part 15 on the hook-shaped head of terminal 3 and due to the weight of battery 1.

One end of the housing is traversed by a metallic cylindrical ring 18 of brass, for example. This ring is electrically connected to the generator circuit by wire 19. According to the invention, a metallic collar or chain 20 passes through this ring to constitute both an antenna and a support means worn around the neck of the user. The physical contact between the chain and the ring ensures the electric contact at point a of the circuit. In order to strengthen the signal emitted by the antenna, the chain length is substantially equal to that of a quarter wave antenna, for the frequency emitted.

FIG. 5 shows another embodiment of ring 18, along a transversal section. This is lined within by a second insulating ring 21 of TEFLON ®, for example. A capacitive coupling of the antenna to the circuit is thus ensured.

A skier, a mountaineer or other person setting out on a hike in the mountains, slips the chain of the transmitter according to the invention around his neck, after having checked that it can operate by means of a device control. This transmitter, practically bulk-free and weighing less than a hundred grams, is no bother to him. At the outset, the housing of the transmitter will be placed in the arrangement shown in FIG. 4 so that the emission of the signals is interrupted. In the event of difficulty necessitating the emission of distress signals, the person in danger causes part 15 of the housing to turn so as to place the housing in the arrangement of FIG. 3, which allows the emission of high frequency signal trains, measured at two trains per second, for example. The signals enable a rescue team, sent out to search for the injured person, to rapidly determine his position, with the use of a receiver fitted with a directional antenna that picks up a signal which is that much stronger since it is located along the axis of the transmitter.

It has thus been possible to locate the transmitter, placed at a distance of 300 m in a hole sunk 1 m below the ice, in less than 3 minutes.

According furthermore to another embodiment of the invention, shown on FIG. 6, antenna 20' is formed of a wide spaced coil wound around part of the housing 14, preferably around the upper part of the housing 14, in a suitable screw thread 23 with a suitable pitch.

Of course, the present invention is not limited to the embodiments described and represented herein, which are only given by way of example. Thus, the transmitter can be fitted with a miniaturized battery-operated checking circuit, for example, without departing from the spirit of the invention.

I claim:

1. An electrical pulse train generator comprising:
    supply means for providing direct-current electrical power;
    a condensor and first resistance serially connected together at a first point and connected across said supply means;
    a transistor having a base, emitter and collector;
    a second resistance connecting the base of said transistor to said first point;
    said emitter of said transistor being connected to said supply means;
    a quartz crystal connected between said collector and base of said transistor, said crystal oscillating at a third harmonic frequency;
    said generator including means turned to the third harmonic frequency of said quartz crystal for producing oscillations at relatively high frequencies in the megahertz range; means for periodically driving said transistor from a blocking state into saturation by charging and discharging said condensor to periodically pass said oscillations; and
    antenna means for emitting said oscillations.

2. The generator according to claim 1, wherein said antenna is insulated from the supply by a shock inductor and wherein a second condensor uncouples the supply means.

3. A portable electronic signal transmitter comprising:
    a housing;
    an antenna;
    a signal generator supported in said housing including;
        supply means for providing direct-current electrical power,
        a condensor and first resistance serially connected together at a first point and connected across said supply means,
        a transistor having a base, emitter and collector,
        a second resistance connecting the base of said transistor to said first point,
        said emitter of said transistor being connected to said supply means,
        a quartz crystal connected between said collector and base of said transistor and inducing oscillations,
        means for periodically driving said transistor from ; a blocking state into saturation by charging discharging said condensor to periodically pass oscillations to said antenna,
    said antenna comprising a chain for supporting said transmitter about a users neck, said chain passing freely in a metallic ring connected to said generator.

4. Transmitter according to claim 3, wherein the length of the chain corresponds to that of a quarter wave antenna at the frequency of said oscillations.

5. Transmitter according to claim 3, wherein a second concentric ring (21) made of an insulating material is positioned inside said metallic ring in such a way as to ensure capacitive coupling of said antenna and said generator.

6. Transmitter according to claim 3, wherein said housing is formed of two parts movable with respect to each other, between a first position in which said parts are brought together so as to form an electric circuit that connects said supply (1) to said generator, and a second position wherein said parts are drawn to disconnect said supply to said generator.

7. Transmitter according to claim 6, wherein the housing is cylindrical, said two parts of said housing being connected by at least one shoulder and associated groove shaped in the form of an "S" so that rotation of part of the housing with respect to the other makes these parts move from said first position to said second position, said positions being defined by the shoulder acting as a buffer against one or other of the ends, of said groove respectively.

8. Transmitter according to claim 6, wherein said antenna comprises a wide spaced coil around one said part of the housing in a screw thread (23) provided in this said part having a suitable pitch.

* * * * *